United States Patent
Takemori et al.

(10) Patent No.: US 9,388,694 B2
(45) Date of Patent: Jul. 12, 2016

(54) RESONANT MECHANISM FOR LINEAR COMPRESSORS

(75) Inventors: Celso Kenzo Takemori, Joinville (BR); Alisson Luiz Roman, Joinville (BR); Paulo Rogerio Carrara Couto, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 430 days.

(21) Appl. No.: 13/976,799

(22) PCT Filed: Dec. 8, 2011

(86) PCT No.: PCT/BR2011/000461
§ 371 (c)(1),
(2), (4) Date: Sep. 23, 2013

(87) PCT Pub. No.: WO2012/088572
PCT Pub. Date: Jul. 5, 2012

(65) Prior Publication Data
US 2014/0007765 A1 Jan. 9, 2014

(30) Foreign Application Priority Data
Dec. 27, 2010 (BR) ..................................... 1005184

(51) Int. Cl.
*F01B 3/00* (2006.01)
*F16J 15/02* (2006.01)
(Continued)

(52) U.S. Cl.
CPC .............. *F01B 3/0023* (2013.01); *F04B 35/045* (2013.01); *F16F 3/02* (2013.01); *F16F 15/043* (2013.01); *F16J 15/022* (2013.01); *F16J 15/04* (2013.01)

(58) Field of Classification Search
CPC ........... F16F 3/02; F16F 15/02; F16F 15/022; F16F 15/04; F16F 15/043; F16F 2230/22; F16F 2232/08; F16F 2234/02; F04B 35/045; F01B 3/0023

USPC ......................................................... 92/130 R
See application file for complete search history.

(56) References Cited

U.S. PATENT DOCUMENTS 6,729,861 B2 * 5/2004 Oh ........................ F04B 35/045 417/363
2006/0110259 A1 5/2006 Puff et al.

FOREIGN PATENT DOCUMENTS

BR    PI 0101879-5 A    12/2002
BR    PI 0601645-6 A    12/2007
(Continued)

OTHER PUBLICATIONS

Translation and drawing for Foreign Reference KR 2002068883A, Aug. 28, 2002.*

(Continued)

*Primary Examiner* — Nathaniel Wiehe
*Assistant Examiner* — Logan Kraft
(74) *Attorney, Agent, or Firm* — Brian J. Colandreo, Esq.; Jeffrey T. Placker, Esq.; Holland & Knight, LLP

(57) ABSTRACT

The present invention relates to a resonant mechanism for compressors which comprises a tubular body (1) containing at least two slot sets (12) that delimit an intermediate surface (13) which central portion has substantially ellipsoidal conformation (14) on which it is located a hole (15) through which the resonant spring will be affixed (2); a resounding spring (2) housed within the tubular body (1); at least two fastening sets (3) for fastening the resonant spring (2) to the tubular body (1), and leaf flat springs (4) alternately and successively mounted with spacers (not shown) along with the circular side faces (11) of the tubular body (1). The slot sets (12) have a specific configuration to allow rigidity and flexibility suitable for the mechanism operation in situations where the resulting axial force differs from zero.

7 Claims, 5 Drawing Sheets

(51) Int. Cl.
*F16J 15/04* (2006.01)
*F16F 15/04* (2006.01)
*F04B 35/04* (2006.01)
*F16F 3/02* (2006.01)

(56) References Cited

FOREIGN PATENT DOCUMENTS

| BR | PI 1000181-6 | A2 | 8/2011 |
|---|---|---|---|
| WO | 01/18393 | A1 | 3/2001 |
| WO | 02/06698 | A1 | 1/2002 |
| WO | 03/081041 | A1 | 10/2003 |
| WO | 2004/007959 | A1 | 1/2004 |

OTHER PUBLICATIONS

International Search Report and Written Opinion from corresponding PCT Application Serial No. PCT/BR2011/000461, dated Jan. 31, 2012, 9 pages.

International Preliminary Report on Patentability from corresponding PCT Application Serial No. PCT/BR2011/000461, dated Jul. 11, 2013, 6 pages.

* cited by examiner

US 9,388,694 B2

RESONANT MECHANISM FOR LINEAR COMPRESSORS

FIELD OF THE INVENTION

The present invention relates to a resonant mechanism for compressors, more specifically to a mechanism which mounting form is made through the neutral point, but having a tubular component provided with cutouts to confer flexibility between the neutral point and the equipment shell.

BACKGROUND OF THE INVENTION

The function of a compressor is to increase pressure of curtained fluid volume into a pressure required for carrying out a refrigeration cycle. It is known to the art the so called alternative compressors, where a piston reciprocally slides within a cylinder to carry out gas compression.

In linear compressors, the piston is driven through a linear electric motor. An actuator element is coupled between the motor and the piston so that it makes the motor drives the piston to reciprocally move within the piston chamber. The piston is usually kept firmly set to the actuator element, so that the piston and the actuator element tend to move in a conjunct motion, so that an excessive vibration is undesirably caused.

In order to solve this inconvenience, the Brazilian patent application No. PI0601645-6 describes a compressor wherein the actuator element is coupled to the piston by means of an elastic element in the form of one or two resonant helical springs (indicated by number 70 in the figures of this application). Thus, the piston and the fastening elements are mounted on an end of the elastic element and the motor magnet and the fastening thereof are mounted on the other end, so that in the natural mode of compressor vibration the phase difference in phase movement between the two ends is 180°, there being a region in this elastic element where the axial vibration tends to be zero. This region in the elastic element is thus called neutral point.

According to the teachings of the patent application PI0601645-6, the coupling of the cylinder to the resonant spring must be carried out through this neutral point, so that the natural modes of compressor vibration are not changed.

In order to carry out such mounting, the compressor of document PI0601645-6 has further a position element coupling the elastic media to the cylinder. The position element (indicated by number 80 in the figures of this application) presents a rigid connection with the resonant spring, and in one of the described constructions, the element 80 is associated with a position rod flat spring affixed to the shell (vide spring number 84 in the figures of the present application).

Although the above construction represents a technical advance over the linear compressors known in the art, the configuration herein provided provides the disadvantage of being unable to present an axial rigidity sufficient for maintaining the mechanism correctly positioned when the forces acting on the set are unbalanced forces. Such unbalanced forces may cause the resulting axial force on the resonant set to be different from zero, which may cause the motor displacement, negatively influencing the efficiency of the compressor there even being the possibility of occurring impact between the same and the shell, causing several disorders.

Among the conditions that may cause such unbalancing there are the motor strength when the compressor is switched off, the gas strength during the coolant loading process and the presence of unbalanced forces that may occur during the operation of the compressor, especially those relative to the gas compression and expansion forces and the motor force.

OBJECTIVES OF THE INVENTION

Therefore, it is one of objectives of the present invention to disclose a resonant mechanism for compressors which is capable of providing certain axial flexibility between the spring fastening point and the compressor shell, so that it provides a minimum rigidity sufficient for keeping the compressor resonant set axially positioned about the compressor shell in situations of unbalanced force, but which has a maximum rigidity sufficient not to alter the natural modes of compressor vibration.

SUMMARY OF THE INVENTION

The present invention reaches the above objectives through a resonant mechanism for compressors comprising a tubular body and a resonant spring housed within the tubular body, the tubular body comprising at least one slot set that delimits an axially flexible surface where it is provided a fastening point for the resonant spring.

In the preferred embodiment of the present invention, it is provided at least two fastening points opposite to each other for the resonant spring, the mechanism comprising two slot sets, wherein each set delimits the axially flexible surface, wherein it is provided each of the two fastening points for the resonant spring.

Yet in the preferred embodiment of the present invention, the mechanism comprises at least one fastening set to fasten the resonant spring to the tubular body, and the fastening set comprises an inner male fastening element which is provided in a fastening hole of the resonant spring, and an outer female fastening element that passes through a fastening hole of tubular body surface.

Thus, the slots may comprise adjacent slots which separate from each other around the fastening hole, so that it is formed a surface, or mirrored slots forming the surface and a spring portion so as to confer resilience to the surface.

Preferably, the surface has a substantially ellipsoidal conformation, and the mechanism further comprises a leaf flat springs provided at each end of the tubular body.

BRIEF DESCRIPTION OF THE DRAWINGS

Figures show:

FIG. 8b—shows a perspective view of the components shown in FIG. 8a.

DETAILED DESCRIPTION OF THE INVENTION

The invention will be described hereinbelow in more details based on the implementation examples represented in the accompanying drawings.

Figure 1:
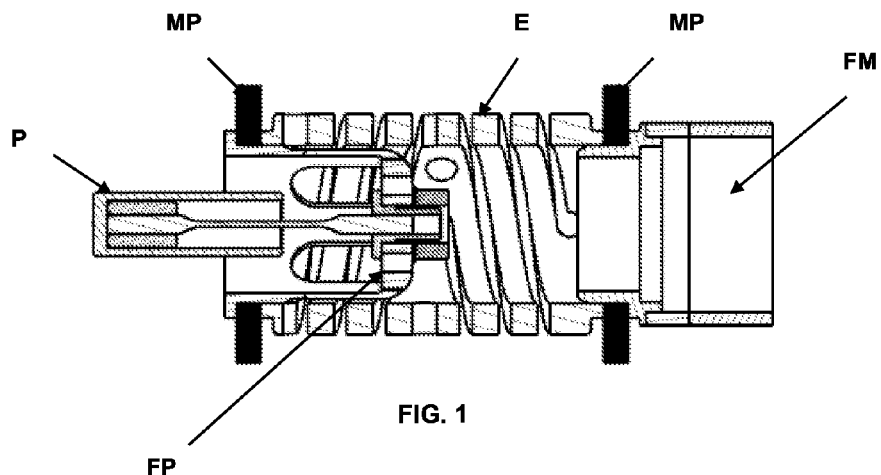
FIG. 1—shows a schematic transverse cross-sectional view of a resonant set of a linear compressor.
Figure 2:
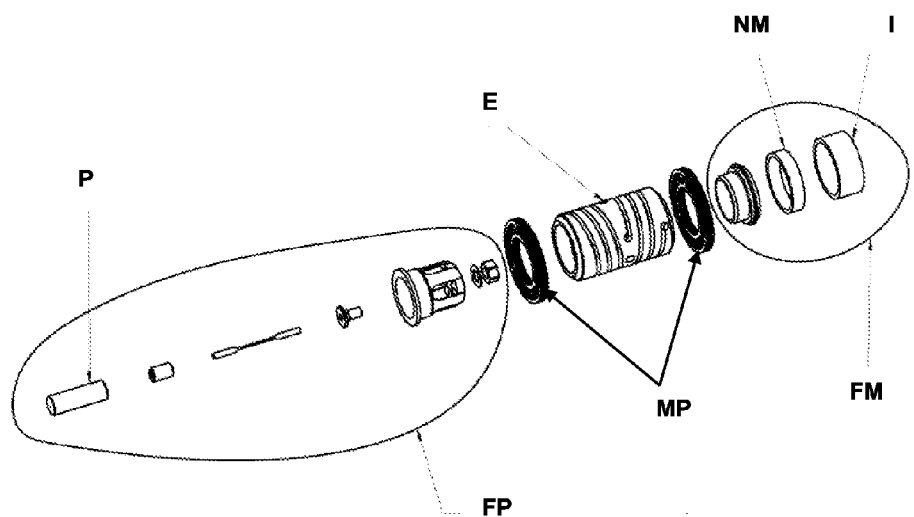
FIG. 2—shows an exploded perspective view of the resonant set illustrated in FIG. 1.
Figure 3:
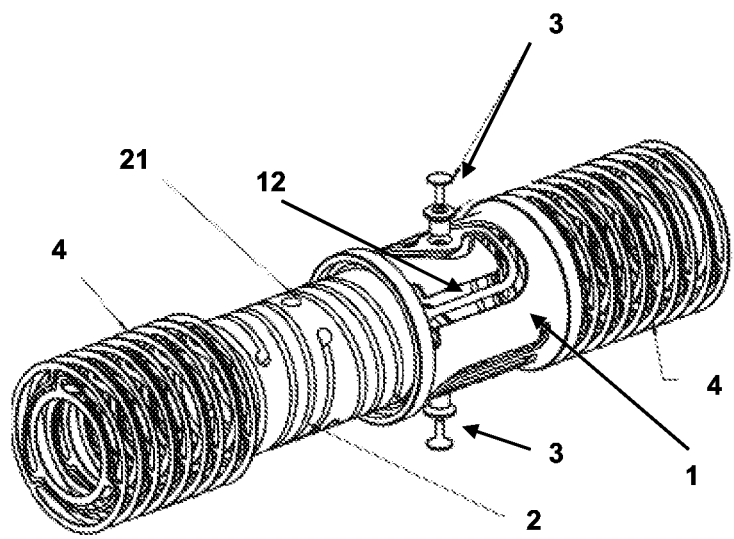
FIG. 3—shows a partially exploded perspective of the resonant mechanism according to a preferred embodiment of the present invention.
Figure 4:
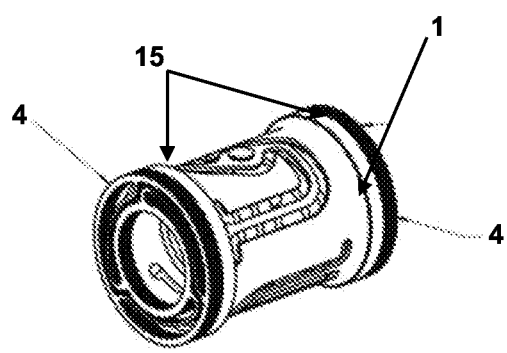
FIG. 4—shows a partially exploded perspective of the resonant mechanism according to the preferred embodiment of the present invention.

FIGS. 1 and 2 illustrate the resonant set of a linear compressor whereto the resonant mechanism of the present invention is applied.

As it can be seen in those figures, the resonant set of a linear compressor basically comprises a reciprocating piston P within a cylinder or compression chamber (not illustrated). The piston P is mounted on one end of an elastic element (helical spring) E through piston fastening elements FP and the actuator element is mounted on the other end of the elastic element E through fastening elements FM. The actuator element may comprise a component motor, such as, for example, a motor magnet I associated with a non-magnetic component NM, such as illustrated in FIG. 2.

A set of flat springs MP may be provided at each end of the elastic means for fastening the set to the non-linear compressor shell (not illustrated).

FIGS. 3, 4, 5 and 7 illustrate a preferred embodiment of the resonant mechanism according to this invention.

In the preferred embodiment, the resonant mechanism for compressors comprises a resonant set such as that illustrated in FIGS. 1 and 2, being provided a positioner element in the form of a tubular body 1, which is capable of providing the resonant set with minimum rigidity sufficient for keeping the set positioned axially about to the compressor shell in situations of non-null resulting axial force, but that provides maximum rigidity sufficient for not altering the natural modes of compressor vibration.

Thus, the tubular body 1 houses in the interior thereof a resonant spring 2, the piston compressor being mounted on one end of the resonant spring 2 and the piston actuator element is mounted on the other end of the elastic element.

In the preferred embodiment of the present invention, the fastening of body 1 to the resonant spring 2 is carried out through two fastening sets 3, each set being preferably fastened to opposing positions of the tubular body. This preferable fastening is schematically illustrated in FIGS. 5 and 5a, the tubular body 1 in those figures being schematically illustrated as a body without details, in order to facilitate the understanding of the fastening.

Figure 5:
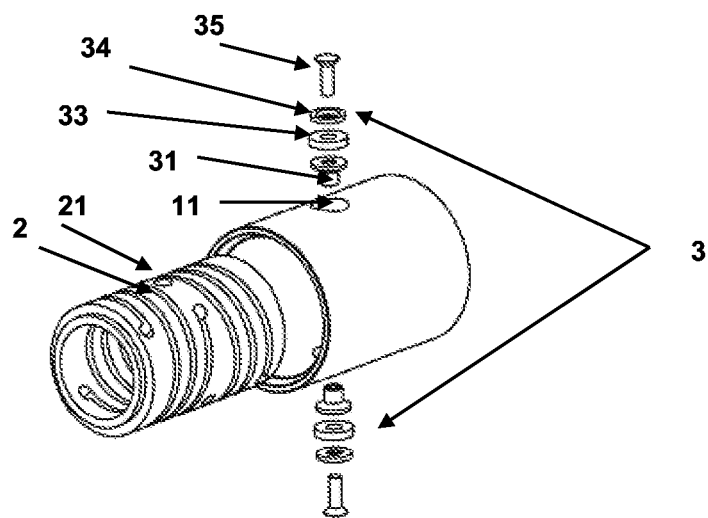
FIG. 5—shows a schematic perspective view of the mounting of one of the resonant mechanism components according to the preferred embodiment of the present invention.
Figure 5A:
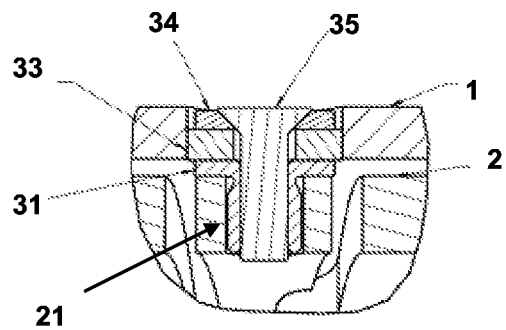
FIG. 5*a*—shows a detailed cut view of the mounting of one of the resonant mechanism components according to the preferred embodiment of the present invention.

Thus, as can it be seen in FIGS. 5 and 5a, in the preferred embodiment of the present invention, each fastening set 3 comprises an inner male fastening element 31 which is provided in a fastening hole 21 of the resonant spring 2, and an outer female fastening element 35 which passes through a fastening hole 11 of the body 11. As it can be seen in the figures, the fastening set may further comprise a washer 34 and an elastomer ring 33.

Figure 6:
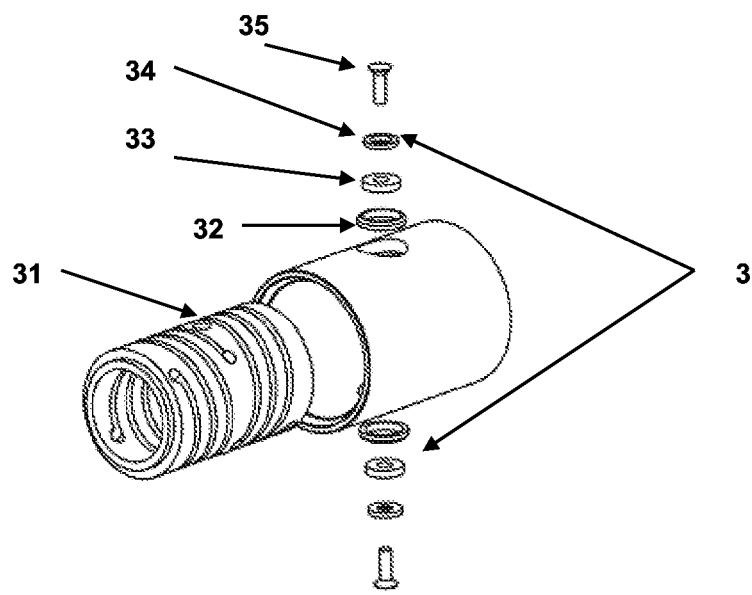
FIG. 6—shows a schematic perspective view of the mounting of one of the resonant mechanism components according to an alternative embodiment of the present invention.
Figure 6A:
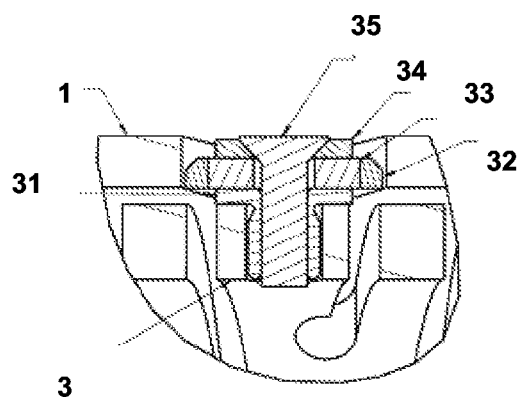
FIG. 6a—shows a detailed cut view of the mounting of one of the resonant mechanism components according to the alternative embodiment of the present invention.
Figure 7:
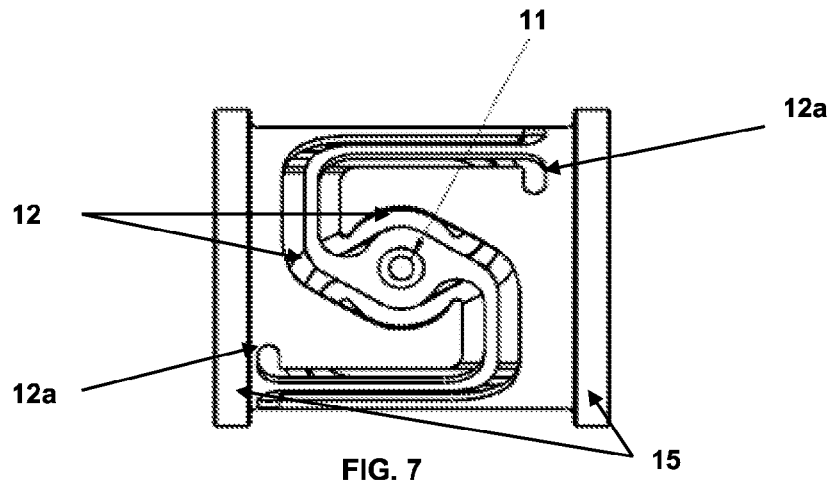
FIG. 7—shows a plane view of one of the resonant mechanism components according to the preferred embodiment of the present invention.

FIGS. 6 and 6a show a fastening set of an alternative embodiment of the present invention, where, in addition to the elements of the FIGS. 5 and 5a it is provided a second washer 32.

In order to ensure the appropriate absorption of the resulting axial forces whether they are null or not without compromising the functioning of the mechanism as a whole, the tubular body 1 preferably comprises two slot sets 12, each set comprising at least two slot that delimit an axially flexible surface 13 where it is provided the hole 11 for fastening the resonant spring. Thus, the absence of material formed by the slots 12 confers certain axial flexibility to the portion 13, while remaining portion of the tubular body 1 maintains a rigidity in the axial direction required to not alter the natural modes of compressor vibration.

Preferably, the surface 13 has a central portion of substantially ellipsoidal conformation.

FIGS. 3, 4, 5 and 7 illustrate a preferred embodiment of the resonant mechanism according to the present invention, wherein the slots of each set 12 comprises adjacent slots which separate from each other around the hole 11, so that it is formed the surface 13.

In this embodiment, the ends of each of the slots 12 present a direction change 12a which prevents stress concentration regions from forming at those ends.

Figure 8A:
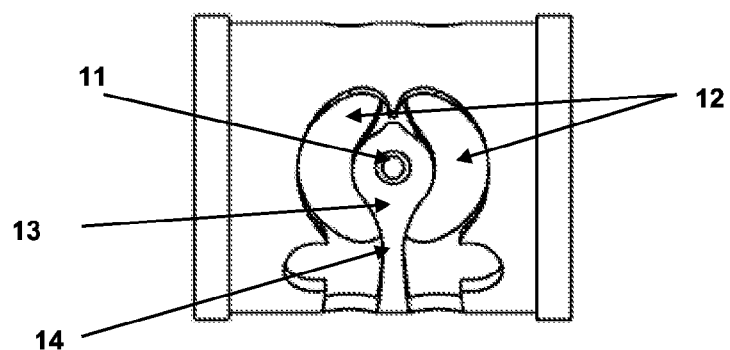
FIG. 8a—shows a plane view of one of the resonant mechanism components according to an alternative embodiment of the present invention.
Figure 8B:
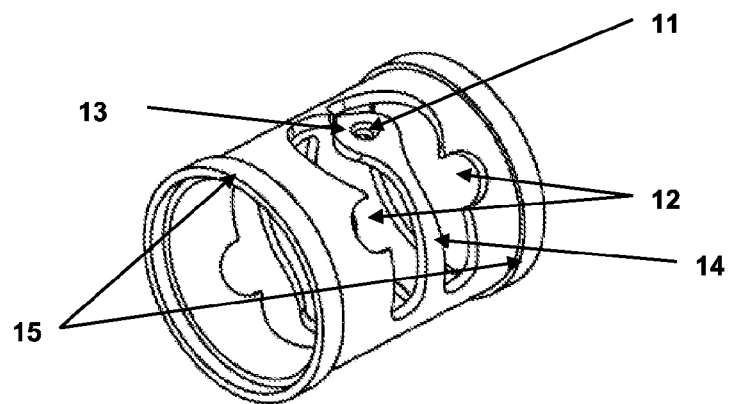

In turn, in an alternative embodiment shown in FIGS. 8a and 8b, the slots 12 comprise mirrored slots that form an elliptical surface 13 and a spring portion 14, which confers cross resilience of portion 13.

Said cross flexibility provided by surface 13 allows the resonant mechanism of the present invention to compensate for the unbalanced forces that would create a non-null resulting axial force acting on the set.

In the preferred embodiment of the present invention shown in the figures, it is further provided leaf flat springs 4 alternately and successively mounted with spacers (not shown) along with the circular side faces 15 of the tubular body 1. One of the functions of those flat springs is to affix the resonant set to the compressor shell (not shown). Another function of the flat springs is to ensure that the concentricity errors during the compressor operation are minimized. These concentricity errors, when excessive, cause the non-functioning of the motor and/or catastrophic piston wear resulting in the non-functioning of the compressor.

It is worth to say that although preferable constructive ways of the present invention have been shown, it is understood that any omissions, substitutions and constructive changes can be accomplished by a person skilled in the art, without departing from the spirit and scope of the claimed protection. It is also expressly provided that all combinations of the elements that perform the same function in the substantially same way to achieve the same results are within the scope of the invention. Replacing elements of an embodiment described by other ones are also fully intended and contemplated Thus, it should be understood that the description provided based on the figures above relates only to some of the embodiments that are possible for the mechanism of the present invention, the real scope of the object of the invention being defined in the appended claims.

The invention claimed is:

1. Resonant mechanism for linear compressors CHARACTERIZED in that it comprises:
   a tubular body (1);
   a resonant spring (2) housed within the tubular body (1); and the tubular body (1) comprising at least two slot sets (12), each of said two slot sets (12) delimiting a respective axially flexible surface (13), wherein at each axially flexible surface (13) is provided a respective fastening point for the resonant spring (2);

wherein said fastening points are opposite to each other.

2. Mechanism according to claim 1, CHARACTERIZED in that it comprises at least one fastening set (3) for fastening the resonant spring (2) to the tubular body (1).

3. Mechanism according to claim 2, CHARACTERIZED in that the fastening set (3) comprises an inner male fastening element (31) that is provided in an fastening hole (21) of the resonant spring (2), and an outer female fastening element (35) that passes through a fastening hole (11) of the surface (13) of the tubular body (1).

4. Mechanism according to claim 3, CHARACTERIZED in that the slots (12) comprise adjacent slots separating from each other around the hole (11), to form the surface (13).

5. Mechanism according to claim 3, CHARACTERIZED in that the slots (12) comprise mirrored slots forming the surface (13) and a spring portion (14).

6. Mechanism according to claim 1, CHARACTERIZED in that the surface (13) has a substantially ellipsoidal conformation.

7. Mechanism according to claim 1, CHARACTERIZED in that it further includes at least one leaf flat spring (4) provided at each end of the tubular body (1).

* * * * *